United States Patent
Prauser et al.

(10) Patent No.: US 8,424,484 B2
(45) Date of Patent: Apr. 23, 2013

(54) PAINT-METERING CYLINDER

(75) Inventors: Rainer Prauser, Erlenbach (DE); Stephan Templin, Rodgau (DE); Winfried Ott, Rodgau (DE)

(73) Assignee: Lactec Gesellschaft Fuer Moderne Lackiertechnik mbh, Rodgau (DE)

( * ) Notice: Subject to any disclaimer, the term of this patent is extended or adjusted under 35 U.S.C. 154(b) by 872 days.

(21) Appl. No.: 12/389,131

(22) Filed: Feb. 19, 2009

(65) Prior Publication Data

US 2009/0211609 A1  Aug. 27, 2009

(30) Foreign Application Priority Data

Feb. 23, 2008  (DE) .......................... 10 2008 010 818

(51) Int. Cl.
*B05B 15/02* (2006.01)
*B05B 15/00* (2006.01)

(52) U.S. Cl.
USPC ............ 118/302; 118/300; 239/104; 222/148

(58) Field of Classification Search .................. 118/300, 118/302
See application file for complete search history.

(56) References Cited

U.S. PATENT DOCUMENTS

| | | | |
|---|---|---|---|
| 3,237,809 A | 3/1966 | Daragan et al. | |
| 4,529,330 A | 7/1985 | Boski | |
| 4,887,513 A | 12/1989 | Ewald et al. | |
| 5,056,829 A | 10/1991 | Kramer | |
| 5,944,045 A | 8/1999 | Allen et al. | |
| 6,102,448 A * | 8/2000 | Fixemer et al. | 285/330 |
| 6,196,478 B1 * | 3/2001 | McPherson, Jr. | 118/629 |

FOREIGN PATENT DOCUMENTS

| | | |
|---|---|---|
| DE | 1 457 440 A | 3/1969 |
| DE | 15 00 603 A | 6/1969 |
| DE | 3144648 | 8/1982 |
| DE | 83 09 558 U1 | 8/1983 |
| DE | 3 629 028 C2 | 8/1988 |
| DE | 199 26 514 A1 | 12/2000 |
| DE | 20 2004 009 278 U1 | 9/2004 |
| EP | 0 290 869 A2 | 11/1988 |
| EP | 0396226 A2 | 11/1990 |
| EP | 0961057 A2 | 8/1999 |
| FR | 2 722 430 | 1/1996 |
| GB | 2 188 118 | 9/1987 |
| JP | 2000-33293 | 2/2000 |
| JP | 2004-275975 | 10/2004 |

OTHER PUBLICATIONS

U.K. Office Action in counterpart U.K. Patent Application No. GB0902779.8 (Feb. 17, 2012).
Translation of Japanese Office Action in counterpart Japanese Patent Application No. 2009-037417 (Mar. 27, 2012).
French Office Action in counterpart French Appln. No. 0950061 (Apr. 27, 2012).

* cited by examiner

*Primary Examiner* — Marianne L Padgett
*Assistant Examiner* — Stephen Kitt
(74) *Attorney, Agent, or Firm* — Greenblum & Bernstein, P.L.C.

(57) ABSTRACT

Paint-metering cylinder for supplying a paint discharge nozzle with a paint material for painting plants, painting plants, and method for rinsing paint-metering cylinder. The paint-metering cylinder includes at least one rinsing device having at least two rinsing agent outlet openings.

11 Claims, 3 Drawing Sheets

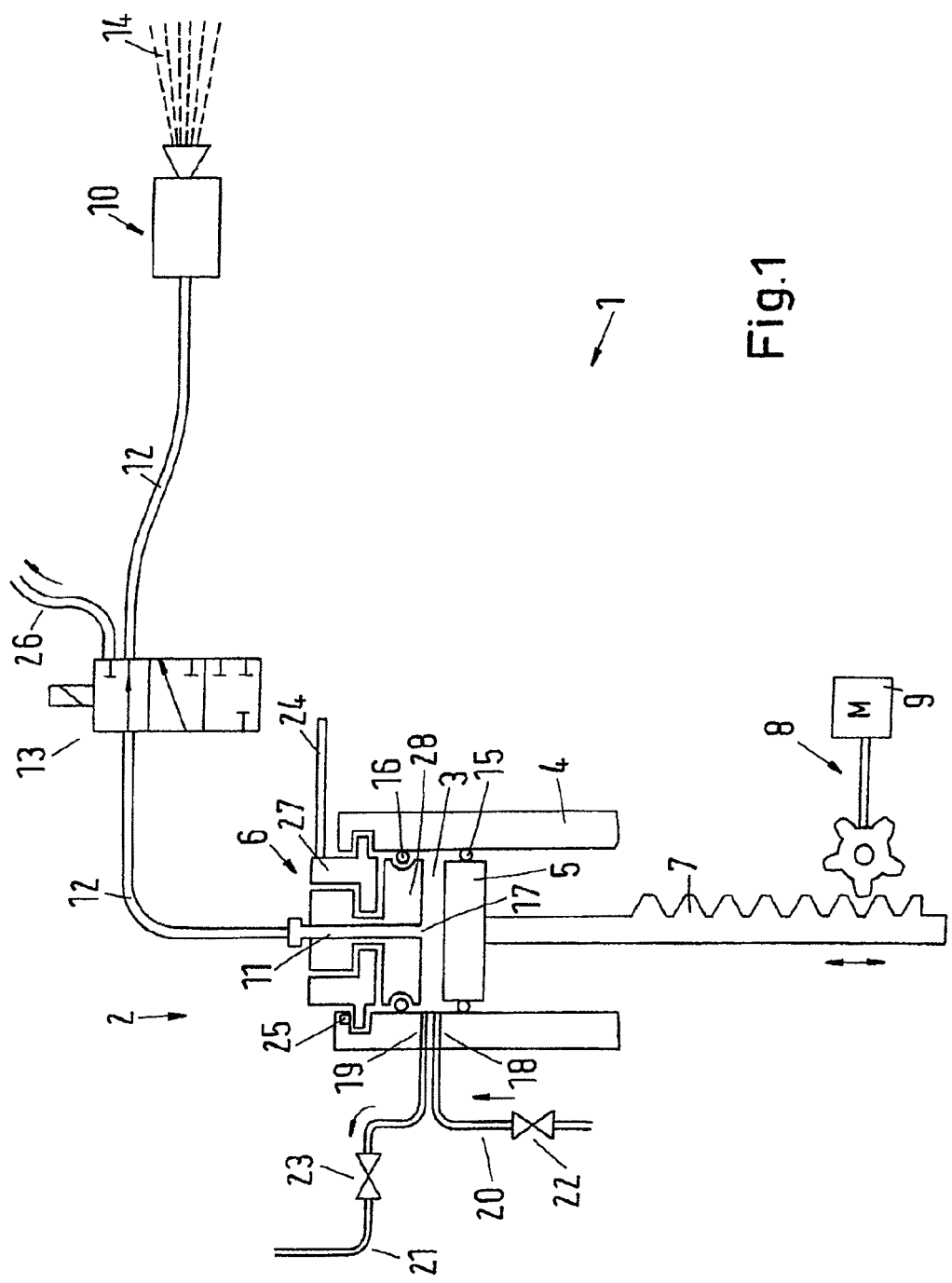

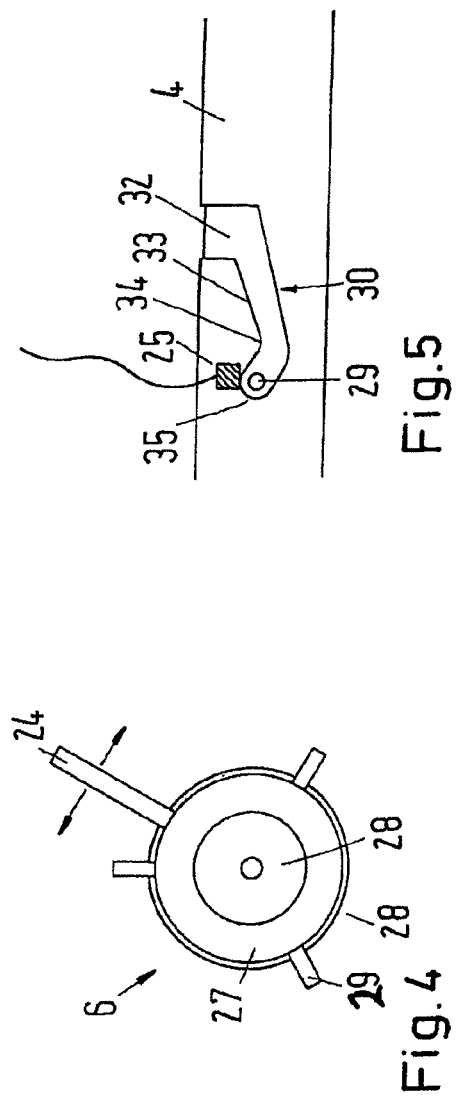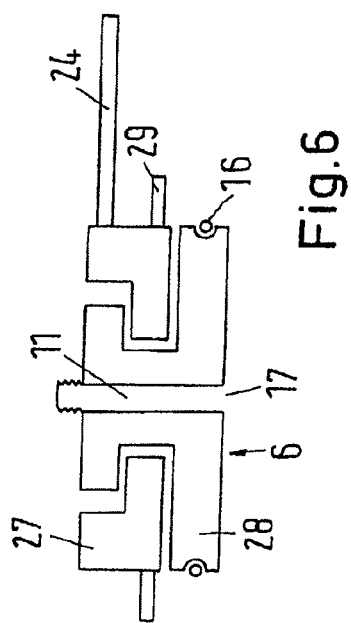

PAINT-METERING CYLINDER

CROSS-REFERENCE TO RELATED APPLICATIONS

The present application claims priority under 35 U.S.C. §119 of German Application No. 10 2008 010 818.9 filed Feb. 23, 2008, the disclosure of which is expressly incorporated by reference herein in its entirety.

BACKGROUND OF THE INVENTION

1. Field of the Invention

The invention relates to a paint-metering cylinder for supplying a paint discharge nozzle with a paint material for painting plants, which paint-metering cylinder has at least one rinsing device for the paint-metering cylinder. Furthermore, the invention relates to a paint-metering cylinder for supplying a paint discharge opening with a paint material for painting plants that has a removable head closure section. Furthermore, the invention relates to a painting plant, and to a method for rinsing a paint-metering cylinder.

2. Discussion of Background Information

Painting plants have been known for many years and have proven successful for providing various materials with a paint application. The focus can be primarily on visual/aesthetic objectives with a paint application of this type (coloring of an object). Likewise the protection of a material—e.g., protective varnishing of metals—can also be the primary objective. As a rule both considerations play a role. Fundamentally, with painting plants of this type, a paint is provided from a reservoir and transported via corresponding pipelines or hose lines to a paint discharge nozzle (e.g., spray gun), at which the paint is discharged. In order to render possible the most finely distributed paint discharge possible, and thus to achieve an optically faultless painting result, and at the same time to be able to save paint material, the paint is emitted in the form of a finely atomized paint mist under high pressure from the paint discharge nozzle. Since the pressures necessary thereby have to be generated and controlled by the components used, this results in a not insubstantial expenditure in terms of the painting plant or the paint metering systems. Furthermore, it must be taken into consideration that in the course of today's automation, the painting systems are to be largely automated and thus, for example, the paint discharge nozzle is often mounted on a robot arm.

The demand from customers for painted workpieces in a personal "individual color" is on the rise. This leads to an increasing extent in many fields to very small production runs per color. Even though manufacturers in painting operations fundamentally endeavor to group into one group as many objects as possible that are respectively to be painted with the same color, which group will be painted one after the other, the number of color changes in production therefore inevitably increases. A color change of this type, however, is not unproblematic.

A color change of a painting plant always takes a certain length of time. During the rinsing operation, the painting plant cannot be used for painting. Furthermore, within the scope of a rinsing operation as little paint as possible should be wasted. Thus, the quantity of rinsing agent that is used in a rinsing operation of the painting plant should also be kept as low as possible.

In the past, these requirements have already led to a number of developments in the field of low-loss minimum quantity supplies for painting plants.

A known structure of this type is available in the form of a flow cup that is connected via a paint release valve of the flow cup to a gear pump. The flow cup is thereby under atmospheric pressure. The pressure increase of the paint to the high pressure necessary for atomizing is carried out in the gear pump. From the gear pump the paint material, being under high pressure, is transported via supply hoses to the atomizer, where it is discharged in the form of a paint mist. One advantage of a painting plant of this type with a flow cup and gear pump lies in the simple structure of the installation. Furthermore, during the operation paint can also be refilled in the fluid reservoir. A simple, continuous paint metering is thus possible. However, the cited advantages are counteracted by some disadvantages.

For example, in the case of a color change, the flow cup must be cleaned manually. To this end, the flow cup is filled with a rinsing agent and cleaned manually by hand with a brush. This is naturally laborious and time-consuming. Although it is possible to clean the paint supply hose, the atomizer and the gear pump automatically, a long time is needed for such cleaning and the amount of rinsing agent required is not insubstantial. This is due in particular to the difficulty of rinsing the gear pump. Due to the gear wheels, there is a relatively large number of angled positions in the gear pump, which can be cleaned only with great difficulty. Typical times for a rinsing operation are approx. 2 to 5 minutes. Even if in part bypass valves are used to allow the rinsing agent to run through the gear pump combined with pulses of compressed air, the consumption of rinsing agent is nevertheless very high. Another disadvantage lies in the use of a gear pump. A gear pump is subject to an operational wear. This first of all causes corresponding costs that are associated with the necessary cyclical replacement of the worn gear pumps. Furthermore, the wear leads to a steadily reduced conveyor effect of the gear pump. Accordingly, a regular readjustment of the painting plant is necessary in order to be able to derive the discharged paint quantity from a pump rotational speed, pump operation time etc. This has also proven to be time-consuming and disadvantageous.

In order to avoid the problems that are associated with the use of a gear pump, the use of metering cylinders has already been considered. Metering cylinders of this type are a cylindrical tube in which a piston is arranged in a displaceable manner. The piston is connected for example via a gear rack to an electromotive drive unit. The pressure buildup and the quantity dosage of the paint located in the metering cylinder is carried out through a change of volume in the metering cylinder interior by a displacement of the piston. This is a great advantage, since the metering cylinder is essentially not subject to any operational wear. A pump readjustment, such as is absolutely necessary with gear pumps, is thus also dispensable. Filling new paint is carried out via an opening of the metering cylinder. The opening of known metering cylinders is carried out by unscrewing a cylinder head of the metering cylinder. In order to be able to control the high pressures located inside the cylinder, the cylinder head is screwed firmly into the cylindrical tube with the aid of a screw closure or of several screw closures. The disadvantage is that opening and closing the metering cylinder is very complex and time-consuming, usually resulting in operational interruptions in the range of several minutes, which is naturally undesirable.

In the case of metering cylinders, it is also necessary to clean the metering cylinder in the event of a color change. In principle, the cleaning can be carried out in that the metering cylinder is unscrewed and cleaned by hand with the aid of a rinsing agent and a brush. However, in the meantime, automatic rinsing devices have also been proposed for metering cylinders of this type. The rinsing device is provided in the area of the cylinder head and cleans the interior when the piston is located in an upper position. The cleaning is carried out via several rinsing bores. Rinsing agent is sprayed in the tangential direction into the cylinder chamber via several rinsing bores that are present in the area of the cylinder head. At least one first bore is directed upwards towards the cover, at least one second downwards towards the piston. This results in a corresponding application of rinsing agent to the piston surface or the cylinder head surface, so that they are optimally cleaned. The rinsing agent exit (wherein the rinsing agent is contaminated with paint) occurs in the center of the cylinder through a centrally arranged bore in the cylinder head.

Even though metering cylinders of this type are fundamentally functional, they still have disadvantages that prove to be disadvantageous in the operation of metering cylinders of this type. In particular, the consumption of rinsing agent is still very high.

SUMMARY OF THE INVENTION

The invention is directed to a metering cylinder that is more advantageous in handling and operation. Furthermore, the invention is directed to an improved rinsing method.

To this end, embodiments of the invention provide a paint-metering cylinder of the above-discussed type that includes a rinsing device having at least two rinsing agent outlet openings. Surprisingly, it has namely been found that the number and the arrangement of the rinsing agent inlet openings are not the only advantageous factors for the quality, the speed and the efficiency of the rinsing method, but in fact to the contrary the rinsing agent outlet openings have a major share in the rinsing result. The influence of the rinsing agent outlet openings is often greater than the influence of the rinsing agent inlet openings. The inventors have established, for example, that the detachment of the paint residue from the cylinder inner wall or the piston inner wall during the rinsing operation represents only a part of the solution to the problem. Moreover, the solution provides that the already detached paint residue is also moved away from the cylinder wall and transported outwards away from the cylinder interior. If the rinsing agent is sprayed tangentially into the metering cylinder, it moves together with the paint residue located therein on a virtually circular trajectory or spiral path in the cylinder head. The droplets of paint are forced outwards due to the centrifugal force. If now the rinsing agent outlet opening, as has hitherto been the case with paint-metering cylinders, is provided radially in the center of the metering cylinder, although the flow in the metering cylinder has a flow proportion in the direction towards the central bore in the cylinder head cover, this flow cannot carry along all of the paint particles due to the centrifugal force. Accordingly, the rinsing action with paint-metering cylinders can be clearly improved if not only one but at least two or more rinsing agent outlet openings are provided. These are preferably provided in different areas of the walls of the paint-metering cylinder.

It is advantageous if at least one rinsing agent outlet opening is arranged tangentially and/or at least one rinsing agent outlet opening is arranged centrally in particular in an axial direction of the paint-metering cylinder. An axial or a tangential alignment of an opening is to be understood in particular to be the mechanical alignment of the corresponding opening and/or the main flow direction of the fluid passing through it when the opening is in operation. The rinsing agent exit opening arranged centrally, optionally arranged in an axial direction, is particularly suitable if a rough rinsing operation is carried out in which larger paint quantities are to be removed. This opening is also suitable if paint particle residue is to be initially detached. The tangentially arranged rinsing agent outlet opening is in particular suitable for conveying out already detached paint residue in a particularly effective manner from the metering cylinder cavity. With a tangentially arranged rinsing agent outlet opening of this type, which is provided in particular in the radially outer area of the metering cylinder, the centrifugal force that acts on the paint particles with a vortex-like flow is not disadvantageous, but to the contrary even advantageous in order to convey them out of the interior of the paint-metering cylinder. It can be provided for the rinsing agent outlet openings to be opened at the same time or opened one after the other. Mixed forms are also possible. Suitable controllable valves can be provided for a corresponding control.

It is possible to provide at least one rinsing agent inlet opening, in particular only one rinsing agent inlet opening, which in particular is arranged in a tangential direction. The tangential spray leads to an eddy that detaches paint particles particularly effectively, in particular those that adhere to a radial wall of the paint-metering cylinder interior. It is completely adequate to provide one single (horizontally aligned) tangential rinsing agent inlet opening, since the rinsing agent after discharge from the rinsing agent inlet opening can be distributed evenly upwards and downwards on the cylinder interior wall. In the prior art it has hitherto been assumed that the rinsing agent sprayed in must have an axial directional component in order to be able to effectively clean the piston surface or the cylinder head interior surface.

It is advantageous if at least one rinsing device is embodied in a head area of the paint-metering cylinder. In this case, the rinsing device can act when the paint-metering cylinder has only a small interior. The paint quantities that are lost through the rinsing operation can thereby be reduced. At the same time, the rinsing operation can also be carried out more quickly and with less rinsing agent.

Furthermore it is possible to act on at least one rinsing agent inlet opening with at least two different media, in particular with two different rinsing agents and/or one rinsing agent and one gaseous medium. This impingement with different media can be carried out either at the same time (rinsing agent/gas mixture) or consecutively (e.g., two rinsing agents). With the use of different rinsing agents, these can be emitted in different process steps, wherein the rinsing agents are optimized for the respective rinsing function. Through the proposed spraying-in of a rinsing agent/gas mixture, furthermore the effectiveness of the rinsing operation can be further improved. The addition of air is preferred thereby, in particular of compressed air pulses (or other gas pulses). In particular the speed of the rinsing operation can be thereby increased and the quantity of rinsing agent required can be reduced.

It is possible to provide an electrically insulated arrangement of the paint receiving chamber of the paint-metering cylinder. This can be carried out, for example, in that the piston, cylinder tube and cylinder head (including spray gun) are structured in a manner galvanically insulated to the environment. The piston drive (e.g., a gear rack, in which a driven gear wheel engages) can in addition be embodied in an electrically insulated manner. With the cited example with a gear rack, for example, the gear rack can be structured from an insulator. It is thus possible to implement particularly easily electrostatic painting methods that show particularly low paint losses.

Furthermore, a paint-metering cylinder for supplying a paint discharge opening with a paint material for painting plants is proposed that has a removable head closure section and that is further developed in that at least one quick-lock closure device is used for attaching the head section. With the use of a quick-lock closure device of this type, the head section can be removed and replaced again particularly easily and quickly. This is particularly advantageous with any change of paint material, since the break in production can be minimized in terms of time thereby. Although it had hitherto been assumed that with the pressures occurring in paint-metering cylinders, screw-top stresses are indispensible in order to achieve an adequate tightness of the paint-metering cylinder, the inventors have been able to establish that an adequate tightness can also be achieved with the use of quick-lock closure devices.

It is possible thereby to embody the quick-lock closure device as a self-engaging quick-lock closure device. That means that the quick-lock closure device is embodied such that it is held by itself in the closed position under an operating load, at least when it has been properly closed beforehand. This can be achieved by suitable projections, recesses, leading inclines, undercuts and the like.

It is advantageous if at least one quick-lock closure device is embodied as a bayonet closure device. Bayonet closures of this type have proven useful and are also very well suited for the provided purpose as a quick-lock closure device. Since bayonet closures are also known per se, adjustment periods for the operating personnel can be minimized.

It is possible that at least one quick-lock closure device can be closed by a rotary motion, preferably a rotary motion of the head closure section. Particularly large forces can be realized precisely with a rotary motion, for example, when a suitable lever length is provided. In particular the rotary motion can affect a firm pressing-on of the head closure section to the remaining paint-metering cylinder parts.

Furthermore, it is possible to provide a closure sensing device for sensing a firm closure of the paint-metering cylinder. A closure sensing device of this type can prevent an operation of the system (squeezing out paint and/or carrying out a rinsing operation) if, for example, there is a danger that the head closure section has not definitely been closed. This can lead to a risk to system parts or to the operating personnel, which naturally is undesirable.

The described paint-metering cylinder with removable head closure section can otherwise be combined in any desired manner with one of the features already described. It then exhibits the corresponding advantages in an analogous manner.

In particular a painting plant is advantageous that has at least one paint-metering cylinder according to the structure already described or according to the proposed possibilities for further development. A painting plant of this type also exhibits the advantages already cited in an analogous manner.

Furthermore, a method for rinsing a paint-metering cylinder is proposed, in which a rinsing agent supplied in a first rinsing step exits through a first rinsing agent outlet opening and a rinsing agent supplied in a second rinsing step at least also exits through a second rinsing agent outlet opening. It has been proven that a two-step method of this type in which different rinsing agent outlet openings are used represents a particularly effective rinsing method. In particular the rinsing times and the rinsing agent consumption can be substantially reduced. It is not excluded thereby that also further rinsing steps are provided. The rinsing agent supplied in the respective rinsing steps can also be of the same type or different and optionally also be carried out with additional media (for example, with an impingement with compressed air, which can be carried out at least in part in a pulsed manner). It is also possible that in a time period lying between the first and the second rinsing step both rinsing agent outlet openings are open at the same time. A respective parametrization can be adjusted depending on the respective geometry of the paint-metering cylinder and the paints respectively used.

In particular it is possible during one of the rinsing steps, in particular during the first rinsing step, to have the rinsing agent discharge carried out through a centrally arranged, in particular axially arranged, rinsing agent outlet opening. The first rinsing step is particularly effective for rinsing out larger paint quantities or to initially detach particularly effectively paint residue adhering to the interior walls of the paint-metering cylinder.

It is furthermore possible to have during one of the rinsing steps, in particular during the second rinsing step, the rinsing agent discharge carried out through a tangentially arranged rinsing agent outlet opening. A rinsing agent discharge of this type is in particular suitable for guiding out particularly effectively already detached paint particles from the interior of the paint-metering cylinder.

Preferably an impingement of the rinsing agent by gas pressure pulses occurs during at least one of the rinsing steps. This can further increase the effectiveness of the rinsing operation.

Additionally or alternatively, it is possible to use at least two different rinsing agents. In particular different rinsing agents can be used for the different rinsing steps. Here, too, the rinsing result can optionally be improved.

Embodiments of the invention are directed to a paint-metering cylinder for supplying a paint discharge nozzle with a paint material for painting plants. The paint-metering cylinder includes at least one rinsing device having at least two rinsing agent outlet openings.

According to embodiments, at least one of: at least one of the at least two rinsing agent outlet openings is arranged tangentially, and at least one of the at least two rinsing agent outlet opening is arranged centrally.

In accordance with aspects of the embodiments, the at least one centrally arranged rinsing outlet opening is arranged in an axial direction.

The paint-metering cylinder can further include at least one rinsing agent inlet opening. The at least one rinsing agent inlet opening can be arranged in a tangential direction. Additionally, the at least one rinsing agent inlet opening can only one rinsing agent inlet opening.

According to features of the invention, the paint-metering cylinder includes a head area. The at least one rinsing device is formed in the head area.

Further, at least one rinsing agent inlet opening can be connected to receive at least two different media. The different media may be at least one of two different rinsing agents and a rinsing agent and a gaseous medium.

In accordance with other embodiments, the paint-metering cylinder can include an electrically insulated paint receiving chamber.

Embodiments of the invention are directed to a paint-metering cylinder for supplying a paint discharge opening with a paint material for painting plants. The paint-metering cylinder includes a removably attachable head closure and at least one quick-lock closure device structured and arranged to attach the head closure.

According to features of the embodiments, the at least one quick-lock closure device may include a self-engaging quick-lock closure device, a bayonet closure device, be closable through rotary motion, or closable through rotation of the head closure.

In accordance with other embodiments, a closure sensing device can be structured and arranged to sense correct seating of the head closure.

The head closure can include a cylinder head closure with displaceable elements. The displaceable elements may be displaceable by one of twisting and shifting. Further, the paint-metering cylinder can include a cylinder head, and the cylinder head closure may include a cover element with a seal and a rotatable closure element. The cover element can be axially movable to close the cylinder head.

According to still other embodiments, the paint-metering cylinder can include at least one rinsing device having at least two rinsing agent outlet openings.

Embodiments of the invention are directed to a painting plant. The paint plant includes a paint-metering cylinder with at least one rinsing device having at least two rinsing agent outlet openings and a paint discharge nozzle. The paint-metering cylinder supplies a paint material to the paint discharge nozzle.

Embodiments of the invention are directed to painting plant. The paint plant includes a removably attachable head closure, at least one quick-lock closure device structured and arranged to attach the head closure, and a paint discharge opening. A paint material is supplied to the paint discharge opening through the head closure Embodiments of the invention are directed to a method for rinsing a paint-metering cylinder. The method includes supplying a first rinsing agent that exits through a first rinsing agent outlet opening of the paint-metering cylinder, and supplying a second rinsing agent that exits through a second rinsing agent outlet opening of the paint-metering cylinder.

According to features of the embodiments, one of the first and second outlet openings is centrally arranged. Further, the first outlet opening is centrally and axially arranged. Additionally, or alternatively, one of the first and second outlet openings is a tangentially arranged. Moreover, the second outlet opening is tangentially arranged.

In accordance with other features of the embodiments, gas pressure pulses can impinge at least one of the first and second rinsing agents.

In accordance with still yet other embodiments of the present invention, the first and second rinsing agents are different rinsing agents, or the first and second rinsing agents are a same rinsing agent.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein FIG. 1 illustrates a diagrammatic view of a painting plant with a metering cylinder;

FIG. 4 illustrates a cylinder head closure part seen from above;

FIG. 5 illustrates a bayonet closure engagement in a metering cylinder wall; and FIG. 6 illustrates a cylinder head closure part in diagrammatic cross section.

DETAILED DESCRIPTION OF THE EMBODIMENTS OF THE INVENTION

Figure 3:
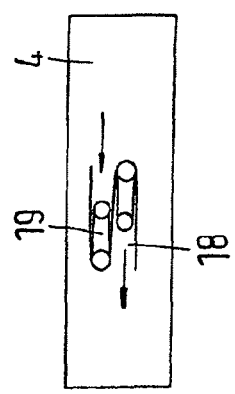
FIG. 3 illustrates the arrangement of fluid openings in a metering cylinder wall.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 shows in diagrammatic view the different components of a painting plant 1 in which a metering cylinder 2 is used as paint source or as a booster pump for the paint to be discharged. The paint is located in a cavity 3 of metering cylinder 2, which cavity is delimited by a cylinder wall 4, a displaceable piston 5 and a releaseably attached cylinder head closure 6. The volume of cavity 3 can be varied by displacing piston 5 in cylinder wall 3. To displace piston 5, it is connected via a gear rack 7 to a drive unit 8. In this case an electric motor 9 is used as a drive for drive unit 8. In order to galvanically separate electric motor 9 (including its power supply) from metering cylinder 2 or spray gun 10, gear rack 7 can be made from an electric insulator. It is thus possible to lay metering cylinder 2 or spray gun 10 on a high-voltage level and to thus render possible an electrostatic painting.

With a spray operation of painting plant 1, drive unit 8 moves piston 5 inwards, i.e., towards cylinder head closure 6. The volume of cavity 3 is reduced. The paint located in cavity 3 is thereby pressed via an outlet channel 11 into a paint line 12 which leads via an electrically controllable shuttle valve 13 to spray gun 10. The paint is here released from spray gun 10 as a fine paint mist 14. Spray gun 10 can be embodied or formed as a hand spray gun and be guided by a user (painter). It is also possible for spray gun 10 to be mounted for example on a robot arm.

So that the paint located in cavity 3 of metering cylinder 2 cannot leak anywhere else, a piston ring 15 is provided between piston 5 and cylinder wall 4. Likewise a sealing ring 16 is provided between cylinder head closure 6 and cylinder wall 4. Sealing ring 16 is thereby partially accommodated in a groove-shaped recess of cylinder head closure 6.

Three access openings 17, 18, and 19 essentially lead to cavity 3 of metering cylinder 2.

A first access opening is present in the form of a central axial opening 17. Central axial opening 17 leads to outlet channel 11 embodied in cylinder head closure 6 and from there further to paint line 12. Depending on the operating condition of painting plant 1 it is used for the discharge of paint or of rinsing liquid, which is explained in more detail below.

A tangential inlet opening 18 and a tangential outlet opening 19 are arranged as a rinsing agent supply opening 18 and as a rinsing agent outlet opening 19, as is explained in more detail below. Tangential inlet opening 18 and tangential outlet opening 19 are arranged in the tangential direction in cylinder wall 4. A tangential direction thereby does not mean a tangential direction in the strict mathematical sense. Instead tangential supply opening 18 or tangential outlet opening 19 can also have a certain radial component. For example, the openings can have an angle of 0 to 15°, in particular 5 to 10°, to the exact tangential direction.

Tangential inlet opening 18 is connected to a rinsing agent advance line 20, and tangential outlet opening 19 is connected to a rinsing agent outlet line 21. In rinsing agent inlet line 20 and in rinsing agent outlet line 21, respectively, at least one preferably pneumatically switchable or also electrically switchable on-off valve 22, 23 is provided that can release and block the passage through corresponding line 20, 21. It is also possible to additionally connect a pressure pulse source to tangential inlet opening 18. It would also be conceivable to provide a separate inlet opening in cylinder wall 4 for the pressure pulse source.

At the start of the operation of painting plant 1, piston 5 is moved to its lowest position with the aid of drive unit 8. An operator of painting plant 1 opens cylinder head closure 6 with the aid of handle 24. A rotary motion about the axis of the cylinder jacket in the tangential direction to the axis of cylinder jacket 4 is necessary for this. Subsequently, the operator removes cylinder head closure 6 upwards so that the access to cavity 3 of metering cylinder 2 is free. Then the user can fill cavity 3 with paint. Subsequently, he closes metering cylinder 2 with the aid of cylinder head closure 6.

A safety switch 25 thereby monitors the correct fit of cylinder head closure 6 in cylinder jacket 4. If a correct fit of a cylinder head closure 6 in cylinder jacket 4 cannot be established, the painting operation cannot be started.

Since cylinder head closure 6 is attached to cylinder wall 4 with a type of bayonet closure, the opening and closing can be carried out particularly quickly and simply. The entire filling operation is thereby shortened not inconsiderably.

The painting operation itself is carried out by a slow pressing of piston 5 into metering cylinder 2. Since drive 7, 8 of piston 5 essentially is not subject to any operational wear, the supply quantity can be precisely adjusted via the movement speed of the drive unit. A readjustment is not necessary either, such as is necessary for example with gear pumps. The metering of the paint discharged can thus be carried out extremely precisely.

When the paint located in cavity 3 has been almost completely discharged and piston 5 has reached its upper end position, a rinsing operation of cavity 3 of metering cylinder 2 can be carried out.

To this end a two-step rinsing method is started. In a first step first on-off valve 22 is opened and the switch position of shuttle valve 13 is changed. Through this switch position rinsing agent flows via rinsing agent advance line 20 and tangential inlet opening 18 in a tangential direction into cavity 3 of metering cylinder 2. The fluid flow formed causes an effective detachment of paint particles that have been deposited on the surfaces that delimit cavity 3 of metering cylinder 2. Through the switch position of shuttle valve 13, the rinsing agent sprayed in can be discharged via central axial opening 17, outlet channel 11, paint line 12 (which is now used as a rinsing discharge line 12), shuttle valve 13 and discharge line 26.

At the end of a period of for example 10 seconds, the switch position of shuttle valve 13 is changed again so that valve 13 is completely closed and second on-off valve 23 is opened. First on-off valve 22 remains unchanged in the opened position. Now the rinsing liquid flowing in tangentially via tangential inlet opening 18 is drained off via tangential outlet opening 19 and rinsing agent outlet line 21. Due to the tangential inflow of the rinsing liquid, paint particles remaining in cavity 3 tend to be moved outwards due to the centrifugal force in the direction towards cylinder wall 4. The paint particles thus have a tendency to avoid central axial opening 17. Since the rinsing agent outlet is now carried out via tangential outlet opening 19, the centrifugal force in this second rinsing step no longer has a disadvantageous effect, but to the contrary has a promoting effect.

At the end of the rinsing operation the two on-off valves 22, 23 are closed again, the switch position of shuttle valve 13 is changed again, piston 5 of metering cylinder 2 is moved downwards by drive unit 8 and metering cylinder 2 is thus available for filling again.

FIGS. 2 and 3 illustrate again the position and the type of the arrangement of the different inlet and outlet openings 17, 18, 19. Tangential inlet opening 18 and tangential outlet opening 19 in cylinder wall 4 are respectively arranged in essentially the tangential direction. Inlet opening or outlet opening 18, 19 are embodied in cylinder wall 4 as a type of sink so that essentially no parts project inwards from cylinder wall 4 into cavity 3. As can be seen in particular from FIG. 2, tangential inlet opening 18 and tangential outlet opening 19 are arranged in directions opposed to one another. Thus an increased eddy formation in interior 3 of metering cylinder 2 can result which can cause a better cleaning result. Furthermore, tangential inlet opening 18 and tangential outlet opening 19 are arranged one above the other, that is, displaced with respect to one another. The two tangential openings 18, 19 do not thereby influence one another in a disturbing manner either, so that a further increased cleaning effect can be achieved. It should be noted that tangential inlet opening 18 and tangential outlet opening 19 do not necessarily have to be arranged in an approximately identical radial position (offset by 0° with respect to one another). Instead, different radial positions can also be realized, such as in particular an angle of 30°, 45°, 60°, 90°, 120°, 145°, 160°, 180°, 210°, 225°, 240°, 270°, 310°, 325° and 330°.

Figure 2:
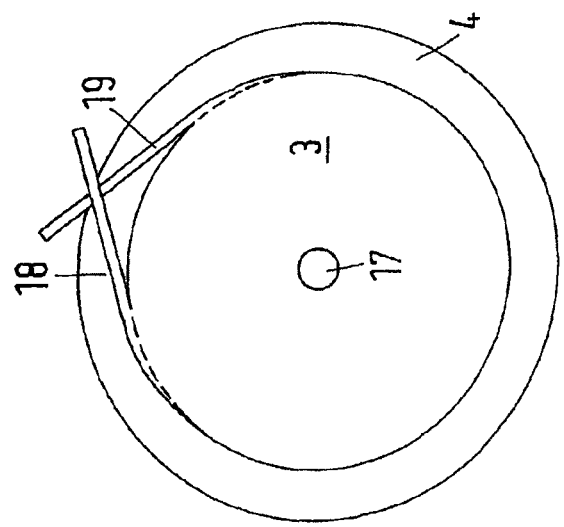
FIG. 2 illustrates the arrangement of fluid openings in diagrammatic view seen from above.

Central axial opening 17 indicated in FIG. 2 is embodied in cylinder head closure 6 (see FIG. 1). It is located essentially in the radial center of cylinder wall 4. Slight deviations can prove to be advantageous, however, for example, for reasons of flow technology or production engineering.

In FIGS. 4 through 6, a bayonet-type closure for cylinder head closure 6 is illustrated in more detail. FIG. 4 thereby shows cylinder head closure 6 in a diagrammatic plan view from above. FIG. 6 shows cylinder head closure 6 in a diagrammatic cross section.

As can be seen particularly well from FIG. 6, cylinder head closure 6 is essentially composed of two disk-type main assemblies 27, 28. Upper ring 27 has a handle 24 and several pins 29, which project into corresponding engagement recesses 30 of cylinder wall 4 (see FIG. 5). Upper ring 27 is positively connected to lower disk 28. The positive connection is embodied such that upper and lower element 27, 28 can be twisted with respect to one another, but cannot be lifted off one another. Outlet channel 11 is embodied in the center of lower disk 28, which outlet channel forms on one side central axial opening 17 of cavity 3 of metering cylinder 2. At the other end of outlet channel 11 in this case a screw thread 31 is provided, on which paint line 13 can be screwed. Furthermore on the radially outer area of lower disk 28 a receiving groove is provided in which a sealing ring 16 is located.

This construction avoids it being necessary during the rotary movement of the ring 27 necessary for closing the cylinder, for sealing ring 16 attached to disk 28 to be rotated with it in the tangential direction. The wear of sealing ring 16 is thereby considerably reduced.

If cylinder head closure 6 is to be attached to cylinder wall 4 by a user, the user first sets pins 29 of upper ring 27 of cylinder head closure 6 in axial areas 32 of engagement recesses 30 in cylinder wall 4. Subsequently, the user rotates the two disks 28, 27 with respect to one another with the aid of handle 24 so that pins 29 slide along insert incline 33 of engagement recesses 30 in cylinder wall 4. Cylinder head closure 6 is thereby pressed into metering cylinder 2. After passing beyond a lug 34, pins 29 finally reach an undercut area 35 of engagement recess 30 in cylinder wall 4. Cylinder head closure 6 is thus securely held in position on metering cylinder 2. The end position of pins 29 in undercut area 35 of engagement recesses 30 is additionally detected by fuse switches 25. When they signal a correct fit of cylinder head closure 6, painting plant 1 can be started.

Three, four or five pins 29 or engagement recesses 30 have hitherto proven useful. Otherwise it is sufficient if one fuse switch 25 is embodied only in one engagement recess 30. Engagement recesses 30 or pins 29 can respectively have the same radial distance from one another. However, it is also possible through a variation of the radial distances of pins 29 from one another to embody cylinder head closure 6 in a rotationally fixed manner with respect to metering cylinder 2.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A paint-metering cylinder for supplying a paint discharge nozzle with a paint material for painting plants, comprising:
    at least one rinsing device having at least one rinsing agent inlet opening and at least two rinsing agent outlet openings,
    wherein the rinsing agent inlet opening and a rinsing agent opening of the at least two rinsing agent outlet openings are arranged tangentially to a circumferential wall of the cylinder at separate locations, wherein the tangentially arranged openings include a radial component of 0 to 15°.

2. The paint-metering cylinder according to claim 1, wherein
    another of the at least two rinsing agent outlet opening openings is arranged centrally in the cylinder.

3. The paint-metering cylinder according to claim 2, wherein the at least one centrally arranged rinsing outlet opening is arranged in an axial direction.

4. The paint-metering cylinder according to claim 1, wherein the at least one rinsing agent inlet opening is only one rinsing agent inlet opening.

5. The paint-metering cylinder according to claim 1, further comprising a head area, wherein the at least one rinsing device is formed in the head area.

6. The paint-metering cylinder according to claim 1, wherein the at least one rinsing agent inlet opening is connected to receive at least two different media.

7. The paint-metering cylinder according to claim 6, wherein the different media comprises at least one of two different rinsing agents and a rinsing agent and a gaseous medium.

8. The paint-metering cylinder according to claim 1, further comprising an electrically insulated paint receiving chamber.

9. A painting plant comprising:
    a paint-metering cylinder with at least one rinsing device having at least two rinsing agent outlet openings; and
    a paint discharge nozzle,
    wherein the paint-metering cylinder supplies a paint material to the paint discharge nozzle and the rinsing agent inlet opening and a rinsing agent outlet opening of the at least two rinsing agent outlet openings arranged tangentially to a circumferential wall of the paint-metering cylinder at separate locations, wherein the tangentially arranged openings include a radial component of 0 to 15°.

10. A method for rinsing a paint-metering cylinder comprising:
    supplying a first rinsing agent that exits through a first rinsing agent outlet opening of the paint-metering cylinder; and
    supplying a second rinsing agent that exits through a second rinsing agent outlet opening of the paint-metering cylinder.

11. The method according to claim 10, wherein one of the first and second outlet openings is centrally arranged.

\* \* \* \* \*